United States Patent [19]
Moriconi et al.

[11] Patent Number: 6,158,010
[45] Date of Patent: Dec. 5, 2000

[54] SYSTEM AND METHOD FOR MAINTAINING SECURITY IN A DISTRIBUTED COMPUTER NETWORK

[75] Inventors: Mark Moriconi, Atherton; Shelly Qian, Cupertino, both of Calif.

[73] Assignee: CrossLogix, Inc., Redwood Shores, Calif.

[21] Appl. No.: 09/248,788

[22] Filed: Feb. 12, 1999

Related U.S. Application Data

[60] Provisional application No. 60/105,963, Oct. 28, 1998.

[51] Int. Cl.[7] ........................................ G06F 12/14
[52] U.S. Cl. ........................ 713/201; 709/223; 710/39
[58] Field of Search ................................ 713/200, 201, 713/202; 709/223, 224, 225, 229; 710/39, 40

[56] References Cited

U.S. PATENT DOCUMENTS

| | | | |
|---|---|---|---|
| 5,265,221 | 11/1993 | Miller | 395/725 |
| 5,557,747 | 9/1996 | Rogers | 713/201 |
| 5,835,726 | 11/1998 | Shwed et al. | 709/229 |
| 5,841,869 | 3/2000 | Merkling et al. | 380/25 |
| 5,968,176 | 10/1999 | Nessett | 713/201 |
| 5,983,270 | 11/1999 | Abraham | 709/224 |
| 5,983,350 | 11/1999 | Minear | 713/201 |
| 5,991,877 | 3/2000 | Luckenbaugh | 713/200 |
| 6,035,399 | 3/2000 | Klemba et al. | 713/200 |

Primary Examiner—Thomas C. Lee
Assistant Examiner—Rijue Mai
Attorney, Agent, or Firm—Carr & Ferrell LLP

[57] ABSTRACT

A system and method for maintaining security in a distributed computing environment comprises a policy manager located on a server for managing and distributing a security policy, and an application guard located on a client for managing access to securable components as specified by the security policy. In the preferred embodiment, a global policy specifies access privileges of the user to securable components. The policy manager may then preferably distribute a local client policy based on the global policy to the client. An application guard located on the client then manages access to the securable components as specified by the local policy.

52 Claims, 14 Drawing Sheets

CLIENT

NON-VOLATILE MEMORY 138

APPLICATION GUARD 310

APPLICATION
312

AUTHORIZATION LIBRARY
314

AUTHORIZATION ENGINE
316

LOCAL CLIENT POLICY
318

FIG. 3

SYSTEM AND METHOD FOR MAINTAINING SECURITY IN A DISTRIBUTED COMPUTER NETWORK

CROSS-REFERENCE TO RELATED APPLICATIONS

The present application is related to, and claim priority in, co-pending U.S. Provisional Patent Application Ser. No. 60/105,963, entitled "System And Method For Maintaining Security In A Distributed Computer Network," filed on Oct. 28, 1998.

BACKGROUND OF THE INVENTION

1. Field of the Invention

This invention relates generally to computer security systems, and relates more particularly to a system and method for managing and enforcing complex security requirements in a distributed computer network.

2. Description of the Background Art

Computer security issues have become more complex with the continual evolution of contemporary computer systems. As corporations utilize increasingly distributed and open computing environments, the security requirements of an enterprise typically grow accordingly. The complexity of employee, customer and partner access to critical information assets, while assuring proper security, has proven to be a major hurdle. For example, many organizations deploy applications that allow their external business partners, as well as their own internal employees, to access sensitive information resources within the enterprise. In the absence of adequate security measures, an enterprise may thus be subject to the risk of decreased security and confidentiality.

While most organizations focus their security concerns on protecting the internal network from the outside world, it is estimated that 80–90% of all corporate security breaches come from within an organization (source: Aberdeen Group, September 1997). This further underscores the need to specify and enforce an access control security policy within the enterprise network.

In today's complex business environment, specifying, stating, implementing and managing an enterprise access control policy may be both difficult and inefficient. When corporate data and applications revolved around a mainframe model, the problem of defining and managing access to corporate applications was relatively straightforward. Today, the complexity of business methods, as well as the complexity of distributed application architectures, may force companies to resort to manual, ineffective or highly custom approaches to access control in their attempts to implement the business process.

To secure a complex and distributed computer system, the system may typically employ a combination of encryption, authentication, and authorization technologies. Encryption is a means of sending information between participants in a manner that prevents other parties from reading the information. Authentication is a process of verifying a party's identity. Authorization is a technique for determining what actions a participant is allowed to perform.

Encryption and authentication are well-understood and have led to effective network security products, whereas authorization technology is not as well developed, and is often inadequate for many enterprises. The security approach of most companies today is to focus on the authentication of users to ensure that those users are part of the organization or a member of a select group. Authentication can be accomplished with a number of different approaches, from simple password or challenge response mechanisms to smart cards and biometric devices such as a fingerprint reader. Once users are authenticated, however, there is still a significant problem in managing and enforcing their set of privileges, which may be unique and vary widely between users. The same authentication mechanism can be used for every user, but different authorization mechanisms must be developed for most applications. Therefore, reliable and efficient access control is a much more difficult problem facing enterprises today.

Authentication mechanisms often work together with some sort of access control facility that can protect information resources from unauthorized users. Examples of network security products include firewalls, digital certificates, virtual private networks, and single sign-on systems. Some of these products provide limited support for resource-level authorization. For example, a firewall can screen access requests to an application or a database, but does not provide object-level authorization within an application or database. Single Sign-On (SSO) products, for example, maintain a list of resources an authenticated user can access by managing the login process to many different applications. However, firewalls, SSO and other related products are very limited in their ability to implement a sophisticated security policy characteristic of many of today's enterprises. They are limited to attempting to manage access at a login, or "launch level", which is an all or nothing approach that inherently cannot implement a business-level policy.

A real-world security policy within a large enterprise is a detailed and dynamic knowledge base specific to that organization. The authorization privileges are specific to the constantly evolving set of users, applications, partners, and global policies that the enterprise puts in place to protect its key information resources. A security policy within a large enterprise can consist of tens or hundreds of thousands of individual rules that cover which users are authorized to access particular applications, perform various operations, or manage the delegation and transfer of tasks. Many of these policy rules that implement the business practice of the organization have to be hard coded within custom-built applications or stored in the database.

The key problem is that these policy rules are localized, scattered throughout the organization, and embedded in applications and databases. Such embedding is expensive and error-prone, and mitigates against efficient policy updates. An organization cannot effectively implement and manage the resulting policy. Inconsistencies arise and updates can quickly become unmanageable. Policy queries and analysis from a global perspective are nearly impossible. The resulting policy begins to diverge from the intended business practices of the organization. Compromises are made in the policy implementation at the department level, and auditors can quickly become frustrated.

The increasing security risks associated with the proliferation of distributed computing, including Intranet and Extranet applications, are prompting many organizations to explore a broad range of security solutions for controlling access to their important information assets. Although organizations have a number of solutions to choose from for authenticating users (determining and verifying who is attempting to gain access to the network or individual applications), there is little choice when it comes to controlling what users can do and when they can do it to the extent necessary to implement the kinds of complex security policies required by modern organizations. Organizations have been forced to choose between custom authorization solutions that are costly, error-prone, and difficult to manage, or third-party solutions that are very limited in their ability to control access to information across applications and databases.

A real-world security policy within a large organization is a detailed and dynamic knowledge base that determines which users are authorized to access particular applications, perform various operations or manage the delegation and transfer of tasks, as well as when and under what circumstances they are permitted to do so. Authorization privileges depend upon a constantly evolving set of users, applications, partners, and business polices that comprise the enterprise security policy. A typical enterprise environment consists of several thousand users, hundreds of applications, and a myriad of network resources, resulting in a security policy that can consist of tens or hundreds of thousands of inter-related policy rules.

Typically, organizations attempt to control access to the internals of in-house applications through policy rules that are hard-coded in the application or through stored procedure statements in the database. But as the number of applications and databases grows, this patchwork approach to authorization quickly gets out of hand. First, organizations must incur the costly and time-consuming overhead of developing customized security code for each application. But more importantly, once the code is developed and embedded in an application, the embedded policy rules become impossible to track, difficult to update, and nearly impossible to manage because they are scattered throughout the organization.

With an estimated 80 percent of all security breaches coming from authorized users (source: Forrester Research), advanced policy features and enforcement mechanisms are needed to control access to sensitive information assets. To implement an enterprise policy, organizations need a centralized policy and a powerful way to specify policy rules to give them adequate access control security. At the same time, they need a distributed authorization infrastructure to provide authorization services to all applications with performance and scalability for modern distributed network environments.

Therefore, for the foregoing reasons, an improved system and method are needed to protect the distributed networks of enterprises against unauthorized access to their valuable information assets by managing and enforcing the complex security policy requirements of the organization.

SUMMARY OF THE INVENTION

In accordance with the present invention, a system and method are disclosed to manage and enforce complex security requirements for a computer system in a distributed computer network.

It is therefore an object of the present invention to provide an access control system that can manage individual transactions by users around well-defined, detailed objects within an application. It is also an object of the present invention to provide a policy manager that enables the creation, modification, querying, and analysis of an enterprise access-control policy, as well as the configuration and monitoring of integrated audit logs, while delivering the performance and scalability required to meet the demands of any enterprise. It is a further object of the present invention to provide a system that combines a centrally managed policy database with distributed authorization (access control) services that enforce the policy for all applications across the organization.

It is also an object of this invention to provide a system that works in conjunction with any authentication system, including digital certificates and smartcards, and obviates the need for single sign-on systems by letting organizations set detailed, dynamic rules for exactly who can access which applications, databases, and other network objects. It is a still further object of this invention to provide a robust security policy and authorization service that can be implemented in very heterogeneous environments, across all applications and databases within the organization, thereby completely eliminating the need for embedded, custom security code within applications, and making it possible to centrally manage and administer a consistent, robust security policy for all applications, databases, and network resources. Furthermore, organizations would no longer have to rely on authorization mechanisms provided by packaged or web application vendors that do not integrate with in-house or other third-party products.

In the preferred embodiment, the system comprises a policy manager located on a server for managing and distributing a local client policy based on a global security policy, and an application guard located on a client or server associated with one or more clients for managing access to securable components as specified by the local client policy. The global policy specifies access privileges of the user to securable components. The policy manager may then distribute a local client policy based on the global policy to the client or server. An application guard located on the client or server then manages authorization requests to the securable components as specified by the local client policy. Each authorization request may be recorded in an audit log to keep track of the authorization requests, whether they were granted or denied, and other useful information.

The system and method of the present invention supports centralized management and distributed authorization. A central policy server stores and manages the policy rules in a centrally administered database. A powerful graphical user interface is used to create, manage, and customize the elements of a policy. Security rules can be specified by both novice and expert users. A dedicated authorization service is associated with one or more applications. The central policy server automatically distributes (over the network) only the relevant portion of the enterprise policy to each remote service. This distributed architecture ensures that authorization requests are not bottlenecked at a central service point and provides unlimited scalability and maximum performance, regardless of the number of applications or policy rules involved.

A more sophisticated security policy is possible because the application has the ability to evaluate access privileges upon every access to the information, during every transaction, and at every data request.

Therefore, the present invention more efficiently and effectively manages and protects computer applications, databases, and network resources against unauthorized access in a distributed computer network.

BRIEF DESCRIPTION OF THE DRAWINGS

FIG. 3 is a block diagram of one embodiment of the non-volatile memory located within the client in FIG. 1, according to the present invention;

DETAILED DESCRIPTION OF THE PREFERRED EMBODIMENT

The present invention relates to an improvement in security techniques to protect computer systems against unauthorized access. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes a system and method for managing and enforcing complex security requirements in a distributed computer network, and comprises a policy manager located on a server for managing and distributing a policy to a client, and an application guard located on the client, the application guard acting to grant or deny access to various components of the client, as specified by the policy.

Figure 1:
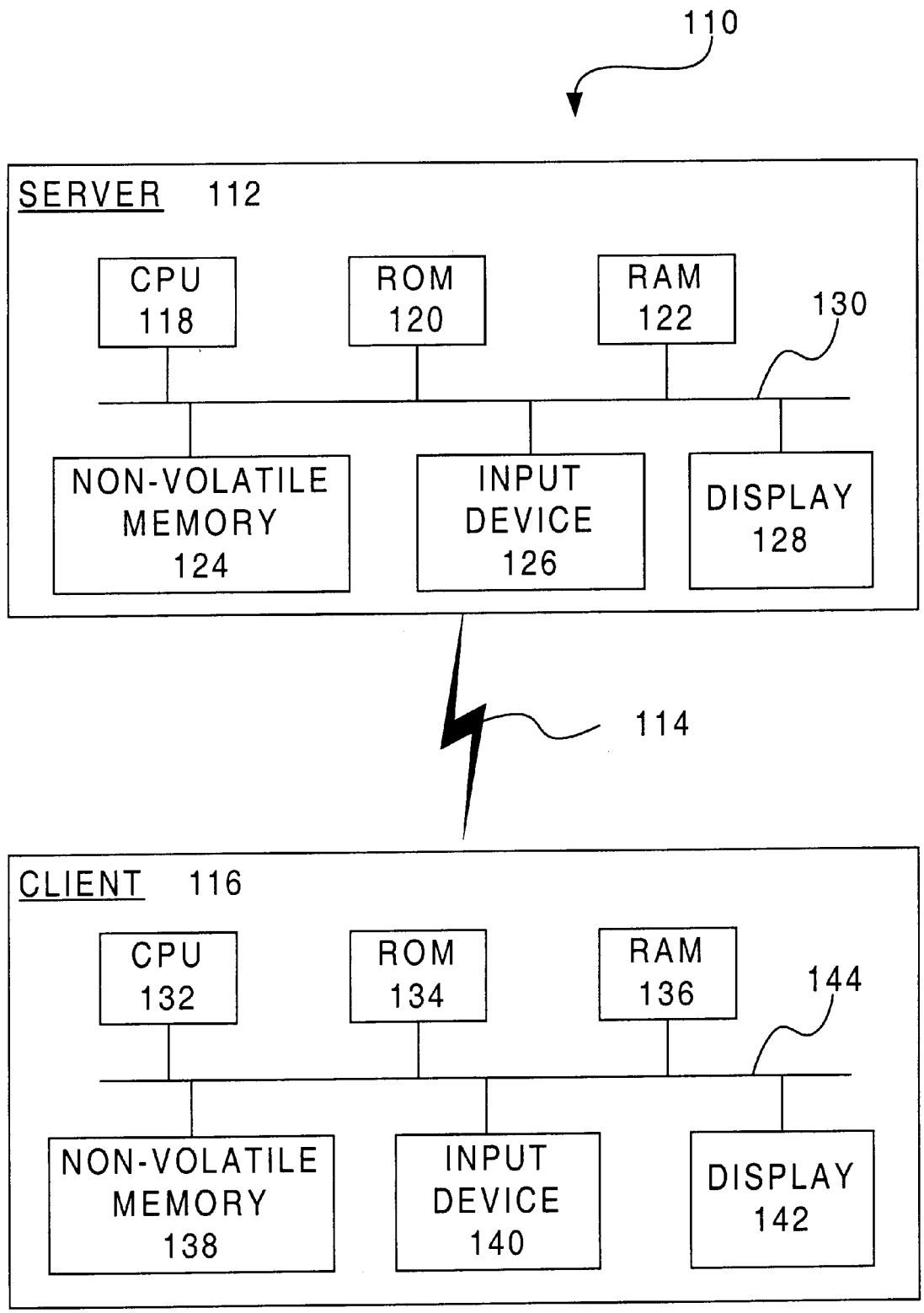
FIG. 1 is a block diagram of one embodiment for one system, in accordance with the present invention.

Referring now to FIG. 1, a block diagram of one embodiment of a distributed computer network system 110 is shown, including a server 112 connected via a network 114 to a client 116, in accordance with the present invention. One client 116 is shown, but server 112 is typically connected to many clients 116. In the FIG. 1 embodiment, server 112 may preferably include a central processing unit (CPU) 118, a read-only memory (ROM) 120, a random-access memory (RAM) 122, a non-volatile memory 124, an input device 126, and a display 128 all connected via a bus 130.

Similarly client 116 may preferably include a central processing unit (CPU) 132, a read-only memory (ROM) 134, a random-access memory (RAM) 136, a non-volatile memory 138, an input device 140, and a display 142 all connected via a bus 144.

Server 112 preferably contains a program stored in non-volatile memory 124 for managing a policy or a set of rules and then distributing the policy to client 116 via link 114. Client 116 preferably contains a program stored in non-volatile memory 138 for granting or denying access to various components or resources of client 116, as specified by the policy distributed from server 112. For example, various components or resources of client 116 can include applications, functions or procedures within an application, data structures within an application, and database or file system objects referenced by an application.

Figure 2:
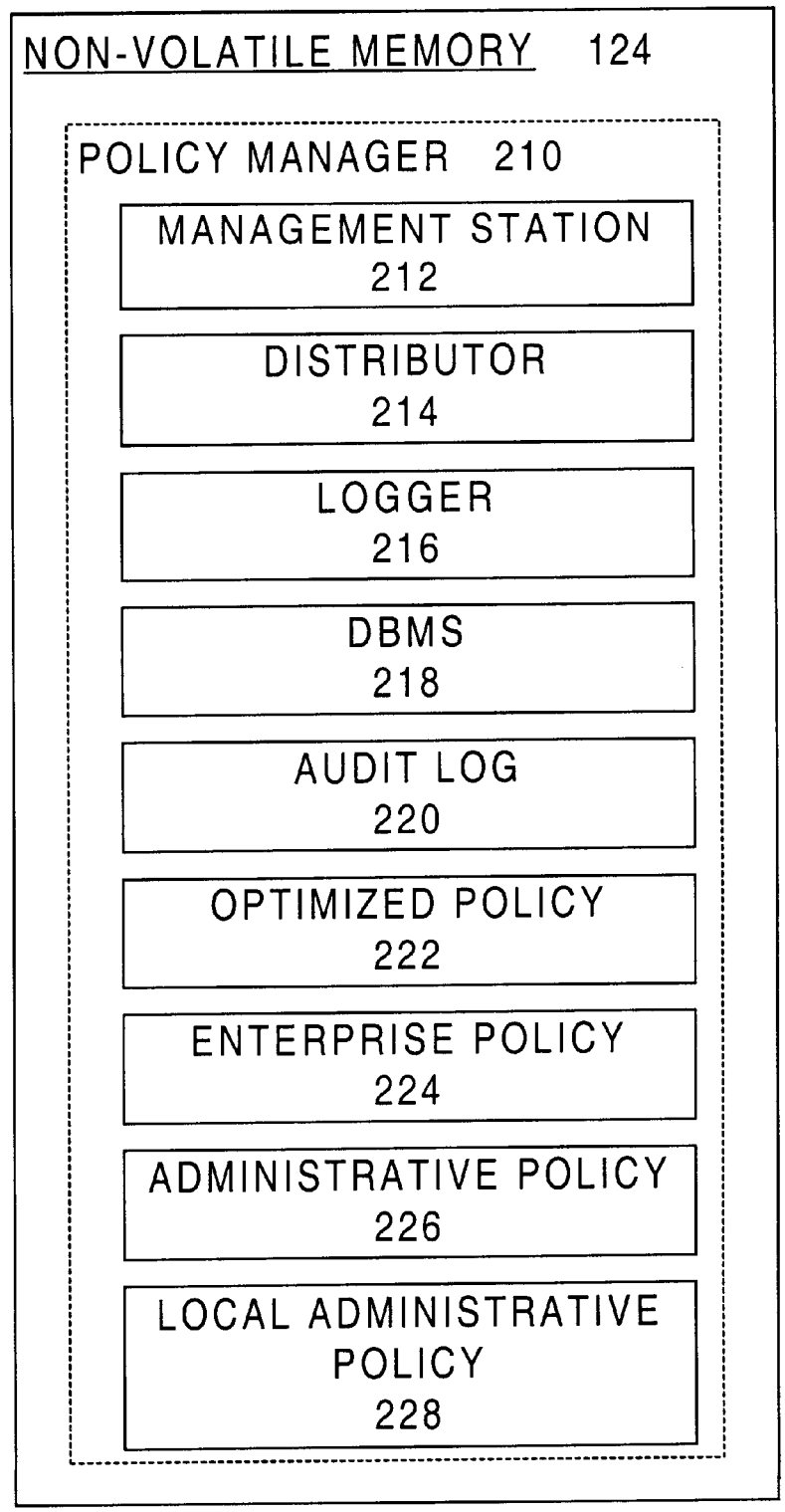
FIG. 2 is a block diagram of one embodiment of the non-volatile memory located within the server in FIG. 1, according to the present invention.

Referring now to FIG. 2, a block diagram of one embodiment for non-volatile memory 124, located within server 112 of FIG. 1, is shown. In the FIG. 2 embodiment, non-volatile memory 124 includes a policy manager 210 that manages and distributes a policy. A policy is intended to specify the security requirements for applications and database objects. A policy may contain thousands of "security rules" that describe several constraints, including what applications a particular user can access, what objects (operations) within an application a user can access, and how those privileges are constrained by time, geography, or external events. In general, a policy or authorization policy should constrain access to both applications and the operations within them. The policy may be generalized to groups and hierarchies, not just specified for individual users. This would greatly improve manageability and lead to more comprehensible, business-level policies.

An authorization policy preferably consists of four components, including objects, subjects, privileges, and conditions. Objects may be applications, or the operations within an application. Examples of objects include applications or methods, web pages, database tables or files, and menu items in a graphical user interface. The granularity of objects has a direct impact on the level of security achieved. The less information an object contains, it is less likely that a user has access to information not needed to perform his job function. On the other hand, the granularity of objects should be balanced against the ease of security management. The more information an object contains, the fewer objects that have to be protected, and the smaller the policy is.

Objects are preferably organized into an object hierarchy. If an object represents an application, then its children objects might represent the methods with the application. Similarly, if an object represents a database, then its children objects might represent the tables and views within the database.

If a user is granted a certain privilege on a parent object, then he is automatically granted the privilege on all the children objects. Similarly, if a user is denied a certain privilege on a parent object, then he is automatically denied the privilege on all the children objects. In other words, privileges are inherited from parent to children objects. Privilege inheritance through the object hierarchy eases security management because rather than granting the same privilege to every child object, the privilege is granted once to the parent object, and if the privileges of an object change, the policy on all the children objects automatically reflect the changes made to the object.

Subjects may be users, or roles containing users, who access protected objects. Subjects correspond to users that have access to information in a system. Users can either be internal or external to a system. Users are authorized to access information in order to perform their job functions. Such access may be controlled so that a user gets access only to the information needed to perform his job function.

An object, such as an application or a database, typically has its own list of users. These are users who can log on to the object and be authenticated by the objects, sometimes through an external authentication server. In a large system, users are preferably maintained separately by one or more directory servers. Users are preferably extracted from objects or directory servers, and are maintained up-to-date by synchronizing with these objects and directory servers.

Alias users may also be supported. An alias of a user is another user who inherits all the privileges of the user under certain conditions. Alias facilitates authorization management by providing fine granularity of control on the propagation of privileges. For example, an alias of a user can be created to perform his job function while he is absent. The inheritance of privileges takes effect only when the user is absent. An alias implements the business requirements of delegation, where the privileges of a user can be delegated to another user under certain conditions. Conditional inheritance of privileges through an alias reduces the burden of security management, because it restricts privilege propagation to situations when certain conditions are satisfied.

Users of an object may be defined as being local to that object. In a typical system, the same user is often represented by different login identifications in different objects. This system may support the notion of a "global" user to capture this situation. Every global user is mapped to a set of local users, one per object. Global users facilitate the centralized management of users throughout the system, even if they are identified by different names in different objects.

A privilege defines the kinds of access that may be allowed on objects. In the preferred embodiment, a privilege is the right to perform a particular action on a specific object. The kinds of privileges that apply to an object depend on the type of the object. Examples of privileges include the right to execute an application, the right to download a web page, the right to query a database table, or the right to view a menu item.

Privileges are granted to users so they can accomplish tasks required for their job. A privilege should be granted to a user only when it is absolutely required for the user to accomplish a task. Excessive granting of unnecessary privileges may lead to compromised security. A user may receive a privilege in two different ways, privileges can be granted to users explicitly (for example, user SMITH can be granted the privilege to execute the payroll application), or privileges can be granted to a role (a named group of privileges), which is then granted to one or more users (for example, a role named "clerk" can be granted the privilege to execute the payroll application, and user SMITH can be granted the clerk role).

Roles are named groups of privileges that are granted to users or other roles. Users granted to a role are the members of that role. A role is often used to represent the set of privileges needed to perform a job function.

The members of a role automatically inherit all the privileges granted or denied to the role. In addition, roles may be organized into a role hierarchy, where parent roles are granted to children roles. If a parent role is granted a privilege, then the children roles are automatically granted the privilege. Similarly, if a role is denied a privilege, then the children roles are automatically denied the privilege.

Roles of an object may be defined as being local to that object. In a typical system, the same role is often represented by different names in different objects. This system may support the notion of a "global" role to capture this situation. Every global role is mapped to a set of local roles, one per object. Global roles facilitate the centralized management of roles throughout the system, even if they are identified by different names in different objects.

Role membership may be further constrained by the notion of mutual exclusion. Two roles are mutually exclusive if no single user can be granted to both roles simultaneously. Role mutual exclusion implements a business requirement of separation of duty. For example, a submit_budget role and an approve_budget role should be mutually exclusive, because no user should be simultaneously authorized to perform both actions.

In a typical policy, there are preferably two types of access rules, a grant rule, and a deny rule. A grant rule states that a privilege on an object is granted to a subject under an optional constraint. A deny rule states that a privilege on an object is denied to a subject under an optional constraint. Additionally, a wild card "any" may be used as a privilege, object, or subject, meaning that any legitimate value could be substituted in its place.

An access request preferably consists of a privilege, an object, and a subject, representing the fact that the subject request authorization of the privilege on the object. An access request matches a grant rule if the privilege, object, and subject math those in the rule, and the constraint in the rule evaluates to "true." An access request matches a deny rule if the privilege, object, and subject match those in the rule, and the constraint in the rule does not evaluate to "false."

An access request is denied if there is a deny rule matching the request, or there are no access rules matching the request. An access request is granted if there are no deny rules matching the request, and there is a grant rule matching the request.

Conditions define the constraints on when objects and subjects can be accessed. The constraints in an access rule specifies further requirements on when the access rule is applicable. These requirements could be conditioned on properties of the object or the subject.

Constraints are preferably expressions formed from conditions and Boolean operators NOT, AND, and OR. Three kinds of built-in conditions may be used: 1) relational operations =, <>, <, <=, >, >= on integers; 2) relational operations =, <>, LIKE, NOTLIKE on strings (the operator LIKE takes a string and a pattern and evaluates to true if the string matches the pattern, the operator NOTLIKE is the negation of LIKE); and 3) set operations IN, NOTIN (the operator IN on integers takes an integer and a set of integers and evaluates to "true" if the integer is in the set, the operator IN on strings is similarly defined, and the operator NOTIN is the negation of IN).

In addition to built-in conditions, users of system 110 may declare custom evaluation functions, which are customer-defined conditions. System 110 may provide an Application Programming Interface (API) for invoking customer-supplied code to evaluate custom evaluation functions. For example, an evaluation function could access a remote database to validate certain properties of the object. Another evaluation function could invoke an external server to authenticate the subject.

Now referring to the FIG. 2 embodiment, policy manager 210 preferably includes a management station program 212 to operate policy manager 210, a distributor program 214 to distribute local client policies to clients, a logger program 216 to track authorization requests, and a database management system (DBMS) 218 to maintain policy data files. Policy manager 210 also includes an audit log data file 220 to record authorization requests, an optimized policy data file 222, an enterprise policy data file 224, an administrative policy data file 226, and a local administrative policy data file 228. The contents and operation of policy manager 210 are further discussed below in conjunction with FIGS. 4, 8, 9, 10, 11, and 12.

Referring now to FIG. 3, a block diagram of one embodiment for non-volatile memory 138, located within client 116 of FIG. 1, is shown. In the FIG. 3 embodiment, non-volatile memory 138 preferably includes an application guard 310 that grants or denies access to various components of client 116, as specified by a pre-determined policy. For example, various components of client 116 can include applications, data, and/or objects. In the FIG. 3 embodiment, application guard 310 preferably includes at least one application 312, an authorization library program 314, an authorization engine program 316, and a local client policy 318. The contents and operation of application guard 310 are further discussed below in conjunction with FIGS. 5, 13, and 14.

Figure 4:
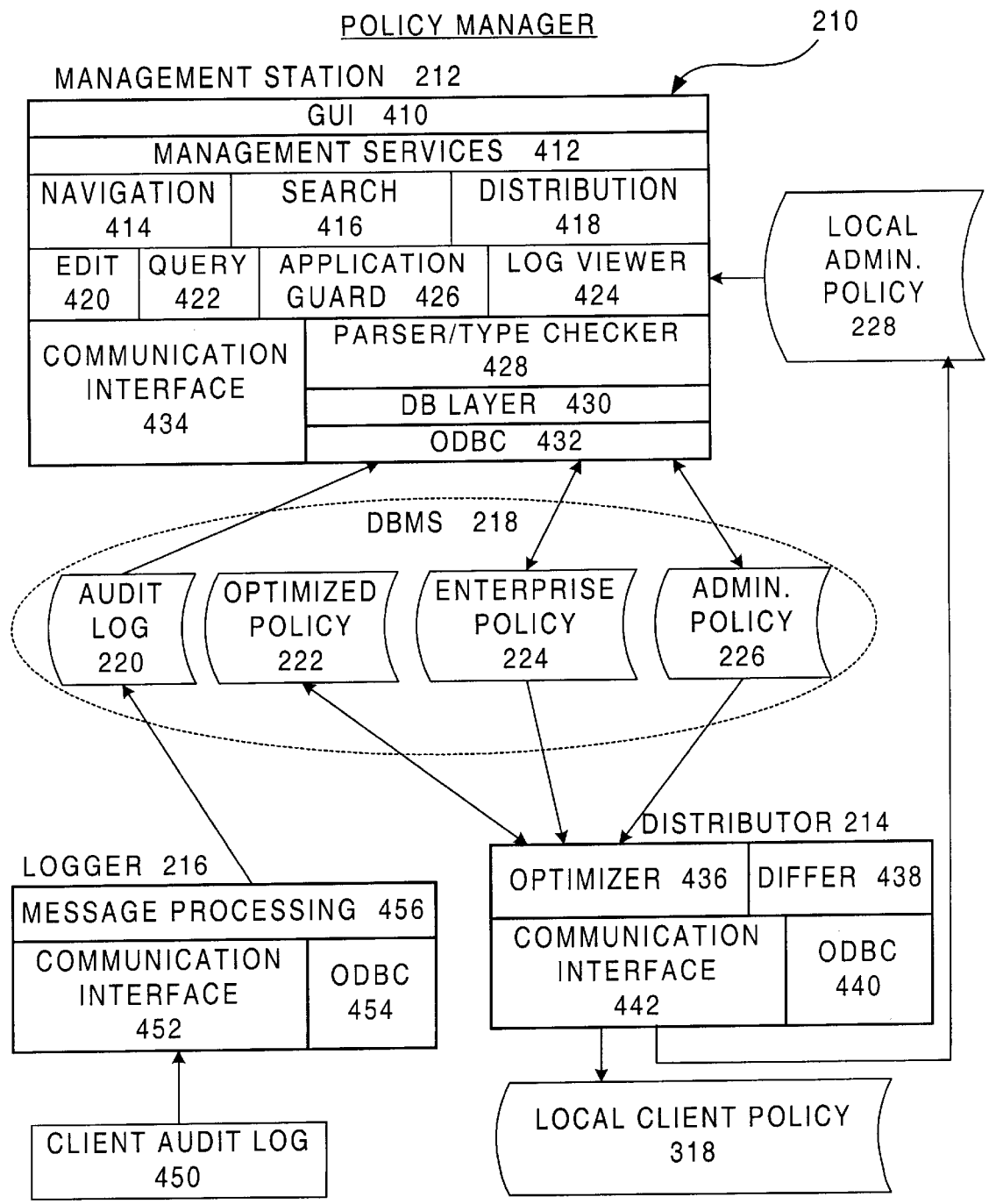
FIG. 4 is a block diagram of one embodiment of the policy manager located within the non-volatile memory in FIG. 2, in accordance with the present invention.

Referring now to FIG. 4, a block diagram of one embodiment for policy manager 210, located within non-volatile memory 124 in FIG. 2, is shown. In the preferred embodiment, policy manager 210 allows system users to implement, analyze, edit and update a centrally-managed security policy or enterprise policy 224. In the FIG. 4 embodiment, policy manager 210 preferably includes a management console or management station 212, a database management system 218, an audit facility or logger 216, and a distributor 214.

In the FIG. 4 embodiment, management station 212 preferably includes a graphical user interface (GUI) 410 for creating or customizing rules by system users. Management station 212 supports concurrent rule development by multiple users. Each policy rule preferably includes four basic components: 1) an object that is to be protected; 2) an access right or privilege; 3) a global or local user to which the privilege applies; and 4) conditions under which the privilege is granted or denied, including built-in access criteria such as time of day or location, as well as custom-defined access criteria.

Graphical user interface (GUI) 410 provides a user-friendly set of menu options or management services 412 to fully operate the policy manager. Programs controlled by the menu options may include navigation 414, search 416, distribution 418, edit 420, query 422, and log viewer 424. The operation of these programs are further discussed below in conjunction with FIGS. 8, 9, 10, 11, and 12. As an alternative to the GUI, the management services can be operated from an application through an API that allows programs to perform the same functions as a human operator. In the preferred embodiment, management station also includes an application guard 426 to allow only authorized administrators to operate management station 212. Local administrative policy 228 provides a set of policy rules specifying which users are authorized to access management station 212.

After the policy rules are created or modified using management station 212, they may then be distributed to appropriate clients 116. Management station 212 includes a communication interface 434 in order to pass information between various other components in system 110.

Prior to when the policy rules are distributed, a parser/type checker 428 preferably reviews and reconstructs the policy rules to make sure that they are syntactically and semantically correct according to a predefined policy language. The policy rules pass through a database layer (DB layer) 430 and an open database connectivity layer (ODBC) 432 before being stored as enterprise policy 224. DB layer 430 formats the policy rules into standard database storage tables, and ODBC 432 provides a common interface to various vendor-specific databases.

Enterprise policy 224 is then passed to distributor 214. An optimizer program 436 within distributor 214 determines which application guard 310 needs to receive which policy rules. A differ program 438 determines what type of changes were made to optimized policy 222, and then distributes only the changed policy rules or local client policy 318 to the appropriate application guards 310 through an ODBC layer 440 and a communication interface 442, which enforce access control to local applications and data.

Since the application guards 310 can be distributed among various clients 116, and each application guard 310 has its own specific local client policy 318, the system provides scalability.

Distributor 214 may also be used to optimize administrative policy 226 into an optimized administrative policy or local administrative policy 228 for use with application guard 426 in management station 212.

Figure 5:
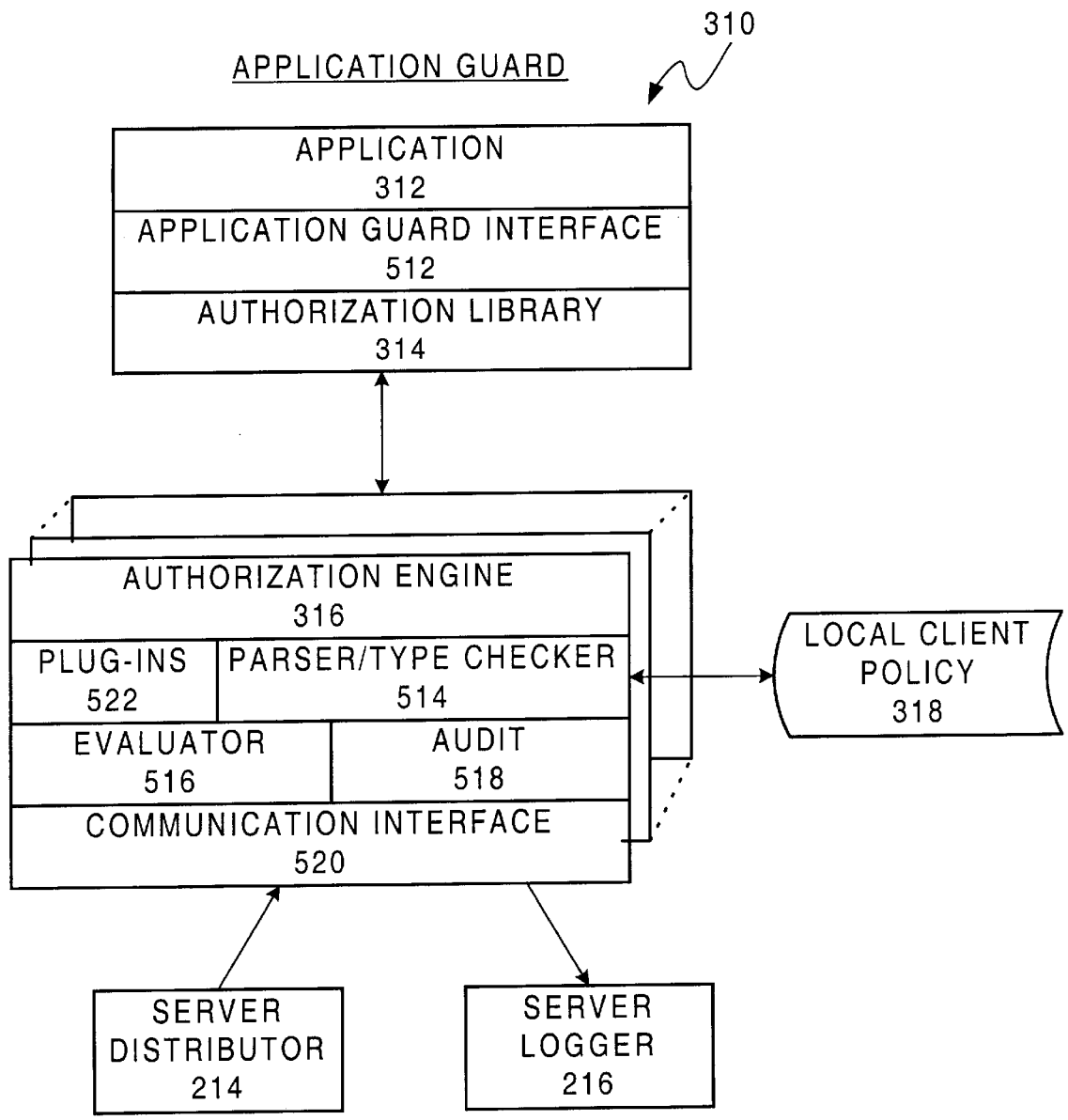
FIG. 5 is a block diagram of one embodiment of the application guard located within the non-volatile memory in FIG. 3, according to the present invention.

Referring now to FIG. 5, a block diagram of one embodiment of application guard 310, located within non-volatile memory 138 in FIG. 3, is shown. Application guard 310 may be distributed on clients 116 throughout an enterprise, and is designed to reside along with each of the protected applications having an associated application guard 310.

Application guard 310 supports transactional access control by allowing an application to be aware of the authorization service and to make authorization requests at each and every user interaction, data request, or business-level transaction. In addition, the design and integration of application guard 310 is fundamental to providing access control to business-level objects within an application since the authorization services have visibility to those named policy objects within the application.

In the FIG. 5 embodiment, application guard 310 is preferably integrated into application 312 through a high-level application programming interface (API) or authorization library 314 that allows application 312 to request authorization services as needed through an application guard interface 512. Typically, this can be done very quickly by including authorization requests at key points in application 312 for control user interaction or database access so that each interaction is protected with a minimum of development.

In the FIG. 5 embodiment, an authorization request is processed by authorization engine 316. A parser/type checker 514 parses local client policy 318 and stores the parsed local client policy in RAM 136. An evaluator 516 then determines whether the authorization request should be granted or denied by evaluating the authorization request with the parsed local client policy in RAM 136. Plug-ins 522 in authorization engine 316 allow for additional capabilities to process and evaluate authorization requests based on customized code. Each authorization request is then recorded in an audit log 518 and transmitted to logger 216 via a communication interface 520.

Users have the option of implementing application guard 310 locally to application 312, as a service running on the same system as application 312, or as a remote authorization service through a remote procedure call to another server.

The advantage of the latter design would be to offload the application server from handling authorization services or allowing a single authorization server to handle a multiple number of applications. A local implementation would provide maximum performance and minimize any network traffic overhead.

As seen in FIG. 5, application guard 310 includes an application guard interface 512 coupled to an application 312 for requesting access to securable components. Application guard 310 also includes at least one authorization engine 316 for evaluating requests from application guard interface 512 as specified by local client policy 318. Multiple authorization engines 316 can be used for added performance and reliability. Furthermore, application guard interface 512 can be located on a client computer, while authorization engine 316 and local client policy 318 can be located on a client server.

The application guard authorization service of the present invention introduces virtually no performance overhead to an existing application 312. The policy rules developed at policy manager 210 are compiled into an optimized form before being distributed to the target application guards 310. This optimized form only distributes attributes relevant to that application guard 310, so that access requests may be evaluated by reviewing only a few rules rather than frequently analyzing the potentially large policy rule base.

Referring back to FIG. 4, logger 216 may then advantageously receive a client audit log 450 through a communication interface 452 and an ODBC 454 from authorization engine 316 (FIG. 5). Client audit log 450 is then formatted by message processing 456 before being stored in audit log 220. Audit log 220 may then be monitored via log viewer 424 in management station 212.

Figure 6:
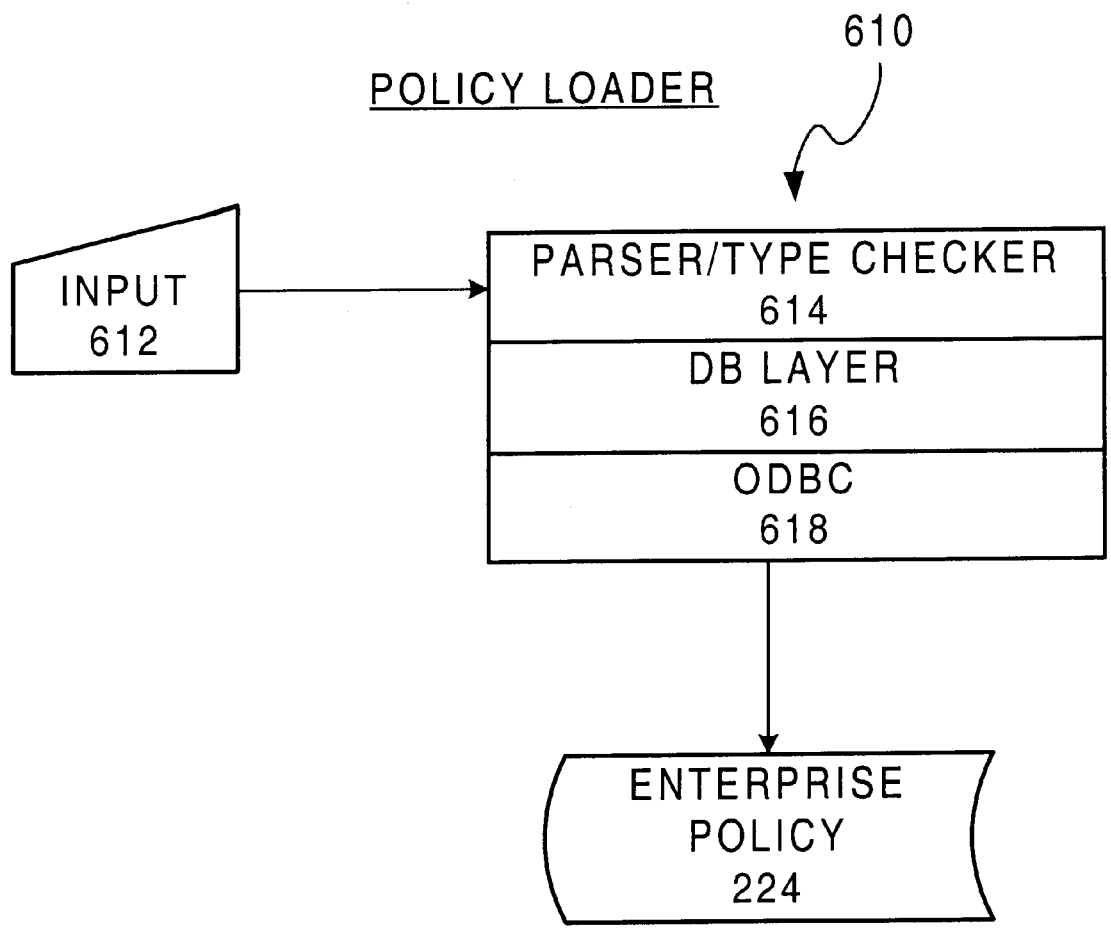
FIG. 6 is a block diagram of one embodiment of a policy loader, in accordance with the present invention.

Referring now to FIG. 6, a block diagram of one embodiment of a policy loader 610 is shown. In the FIG. 6 embodiment, policy rules may be entered one at a time into enterprise policy database 224 via management station 212 (FIG. 4), or the policy rules may alternatively be loaded as a batch process via policy loader 610. Policy loader 610 is an additional utility that bulk loads an existing set of policy rules into enterprise policy database 224. An existing set of policy rules may be entered into policy loader 610 via input 612. A parser/type checker 614 then preferably reviews and reconstructs the policy rules to make sure that they are syntactically and semantically correct according to a predefined policy language. The policy rules may then be passed through a DB layer 616 and an ODBC 618 before being stored in enterprise policy database 224.

Figure 7:
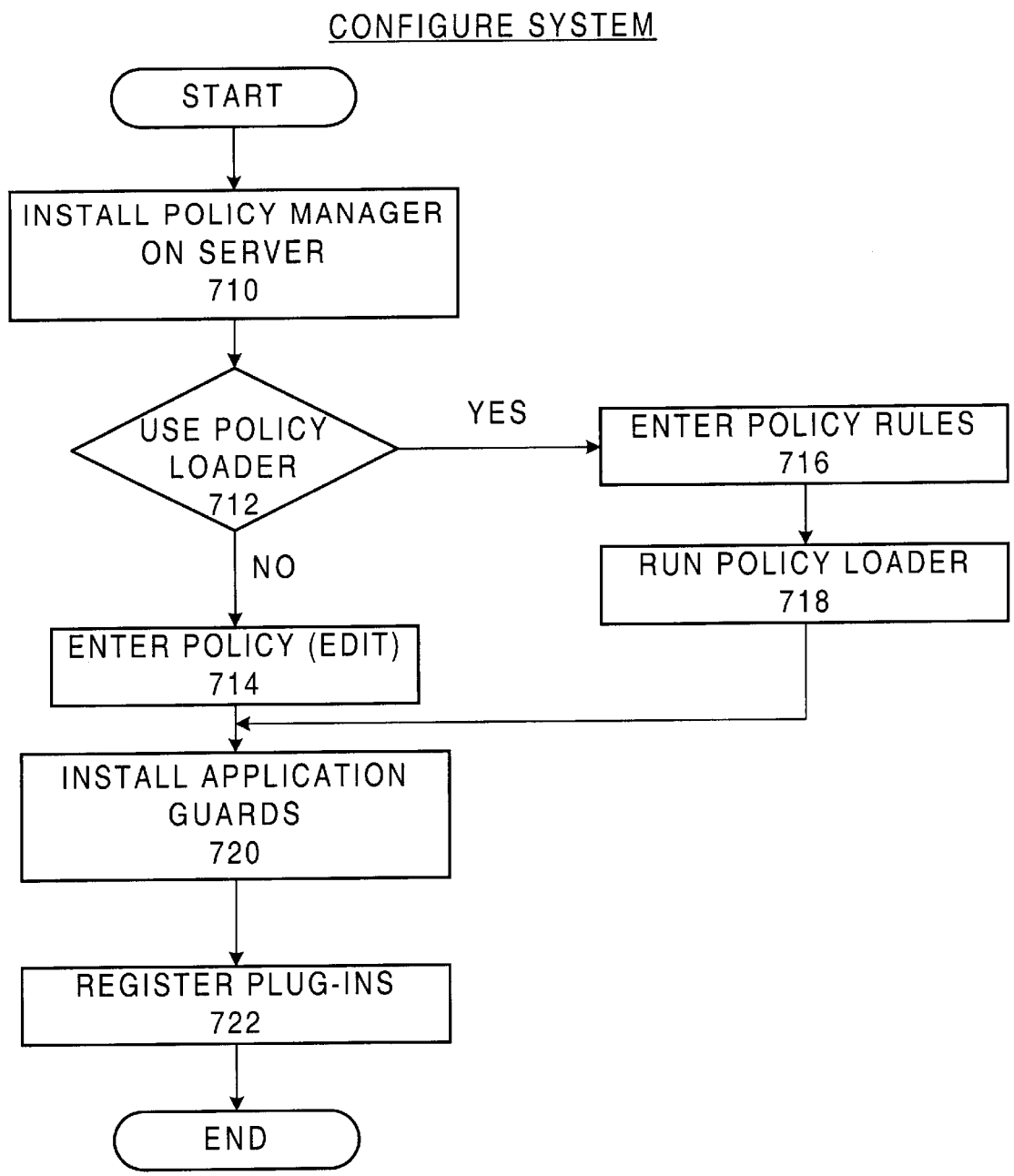
FIG. 7 is a flowchart of one embodiment of method steps to configure a system, in accordance with the present invention.

Referring now to FIG. 7, a flowchart of method steps to configure a system in accordance with one embodiment of the present invention is shown. Initially, in step 710, a system administrator installs policy manager 210 on a server 112. The installation may include management station 212, distributor 214, logger 216, and DBMS 218. After all the components of policy manager 210 have been installed, the system administrator then enters a set of policy rules. In step 712, the administrator can decide whether to use policy loader 610, or to use management station 212 to enter policy rules. If the system administrator decides to use management station 212, then at step 714, policy rules are entered using edit function 420. However, if policy loader 610 is used, then at step 716, policy rules are entered into a file, and at step 718, the file of policy rules passes to policy loader 610.

Next, in step 720, the system administrator installs application guards 310 onto client systems 116, as well as installing local client policies 318 onto client systems 116. Then at step 722, the system administrator registers plug-ins 522 into application guards 318 to allow for additional capabilities in order to process authorization requests based on customized code.

Figure 8:
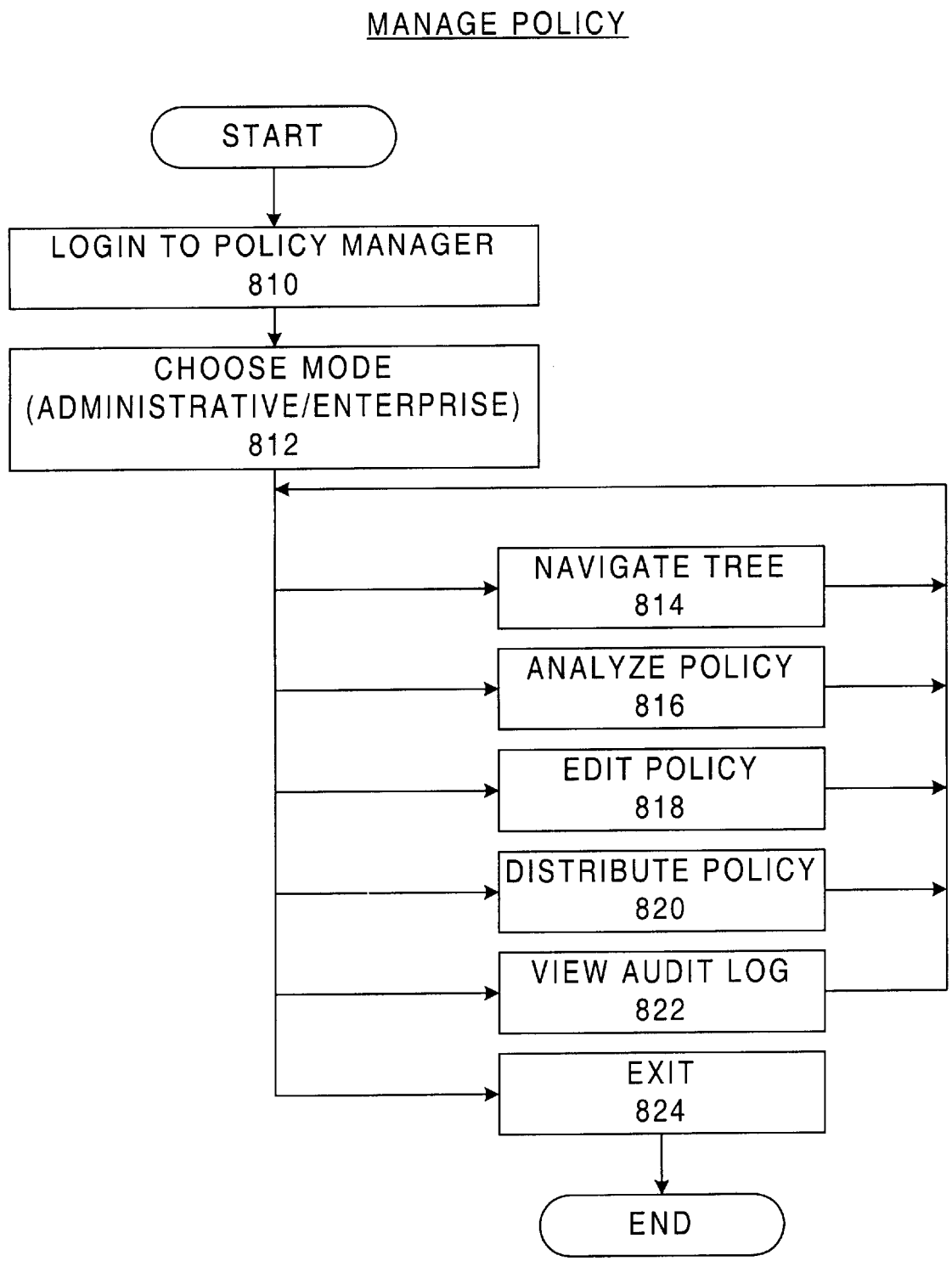
FIG. 8 is a flowchart of one embodiment to manage policy in the management station, according to the present invention.

Referring now to FIG. 8, a flowchart of one embodiment to manage policy under management services 412 in management station 212 is shown. In order to allow for a complex set of policy rules, a number of different functionality features are incorporated into system 110 to facilitate implementation and management.

In the FIG. 8 embodiment, at step 810, an authorized administrator logs in to policy manager 210. Next, in step 812, the authorized administrator chooses between administrative mode or enterprise mode. The administrative mode allows the system administrator to manage administrative policy 226, and the enterprise mode allows the system administrator to manage enterprise policy 224. The system administrator is then presented with six menu options including navigate tree 814, analyze policy 816, edit policy 818, distribute policy 820, view audit log 822, and exit 824. The features of navigate tree 814, analyze policy 816, edit policy 818, and distribute policy 820 are described in more detail through FIGS. 9, 10, 11, and 12, respectively. View audit log 822 is a security feature that allows an administrator to view and track all authorization requests that have occurred at any application guards 310 connected to system 110. The system administrator can choose any of the menu options, or at step 824 the system administrator may then exit the system.

Figure 9:
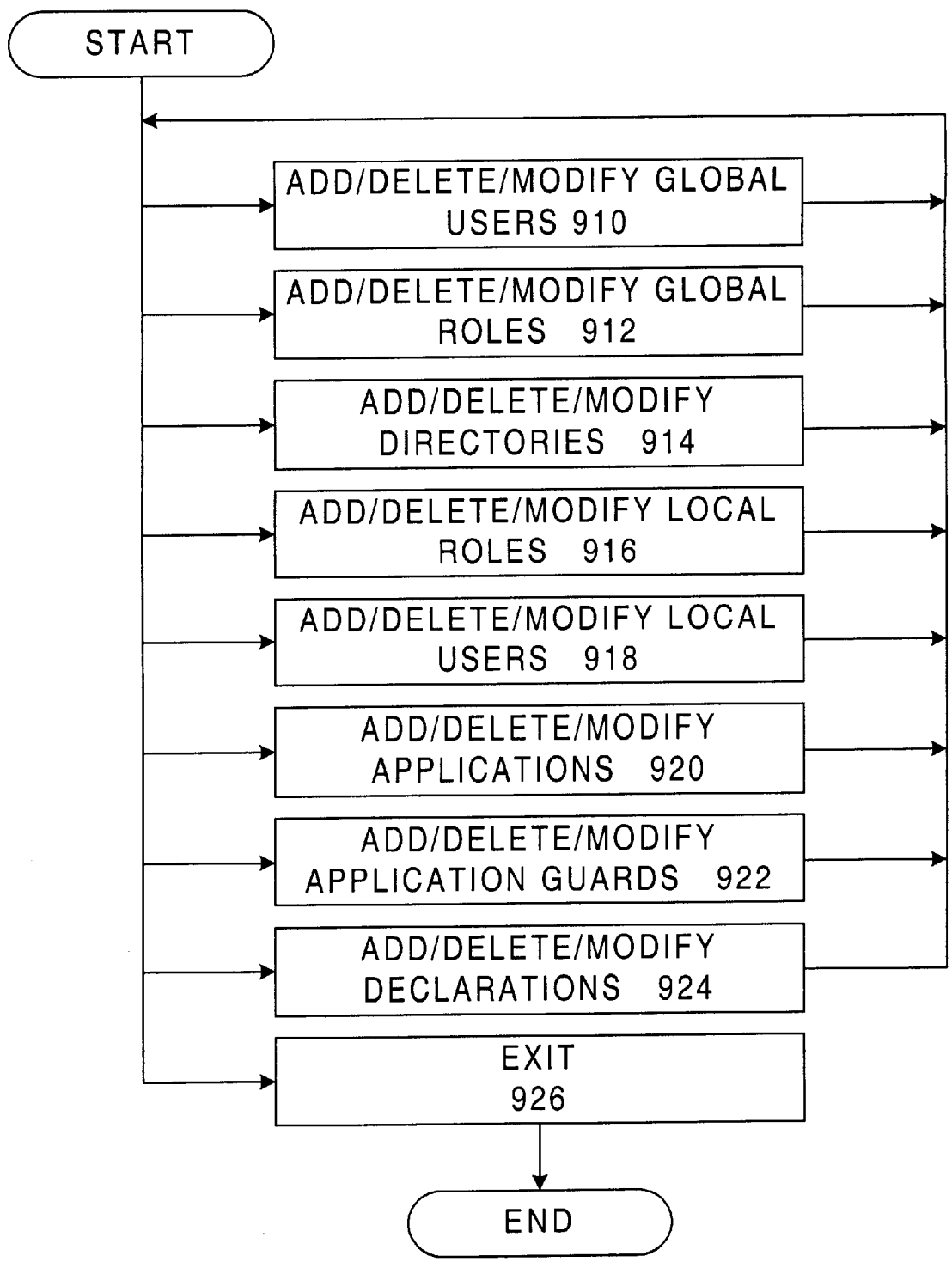
FIG. 9 is a flowchart of one embodiment to navigate tree in the management station, according to the present invention.

Referring now to FIG. 9, a flowchart of one embodiment of menu option navigate tree 814 in management station 212 is shown. Navigate tree 814 provides a set of options for an administrator to add, delete, and/or modify features on server 112 or client 116. The features that an administrator may add, delete, and/or modify include global users 910, global roles 912, directories 914, local roles 916, local users 918, applications 920, application guards 922, and declarations 924. At step 926, the system administrator may then exit from navigate tree 814.

Figure 10:
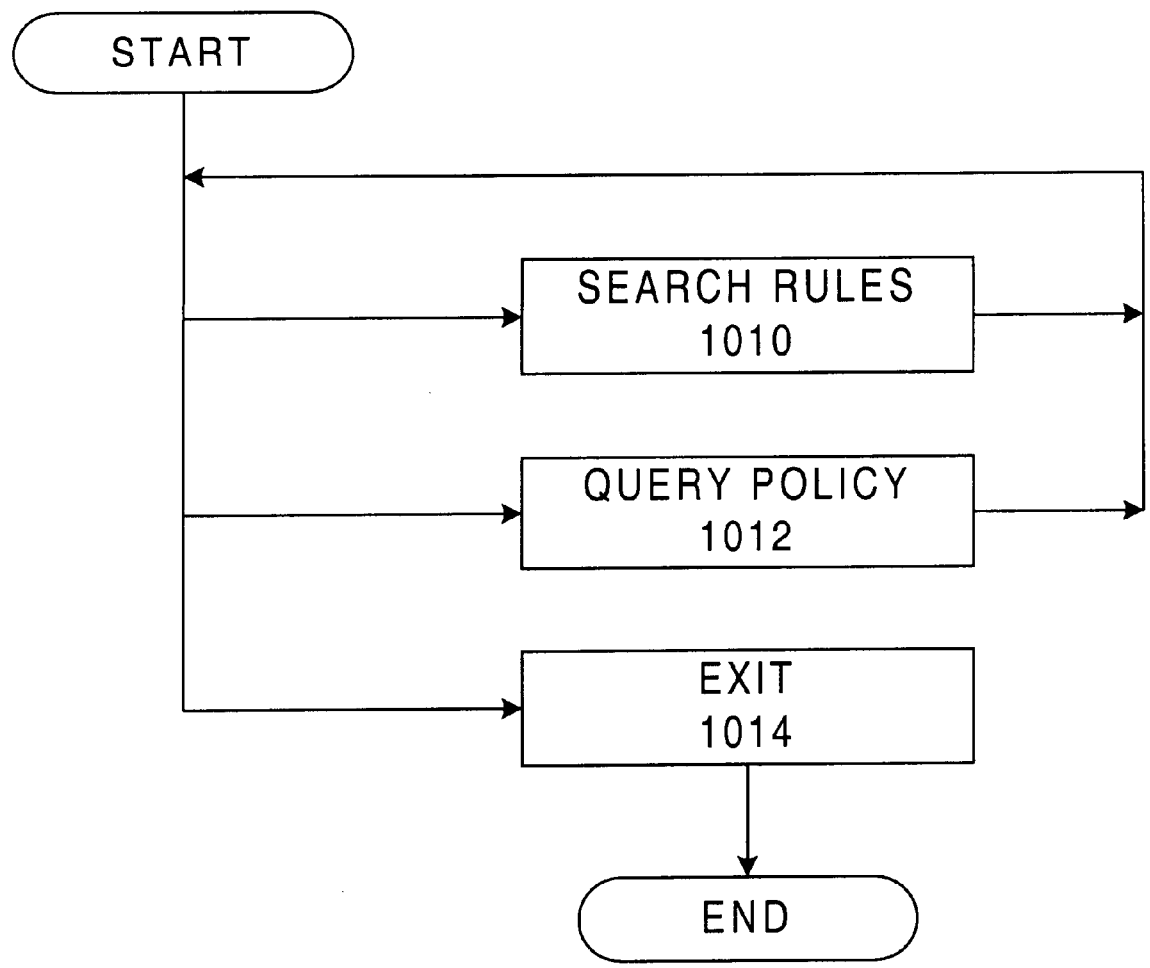
FIG. 10 is a flowchart of one embodiment to analyze policy in the management station, in accordance with the present invention.

Referring now to FIG. 10, a flowchart of one embodiment of menu option analyze policy 816 in management station 212 is shown. Analyze policy 816 preferably allows an authorized user to analyze and view rules and policies within enterprise policy 224. At step 1010, the user has an option to search rules, or at step 1012 to query policy. When search rules is selected, a search can be made for all the grant rules or all the deny rules pertaining to a particular user. When query policy is selected, a search can be made on who is granted or denied what privilege on which objects under what conditions.

After analyzing and viewing rules or policies, at step 1014 the system administrator may exit from analyze policy 816.

Figure 11:
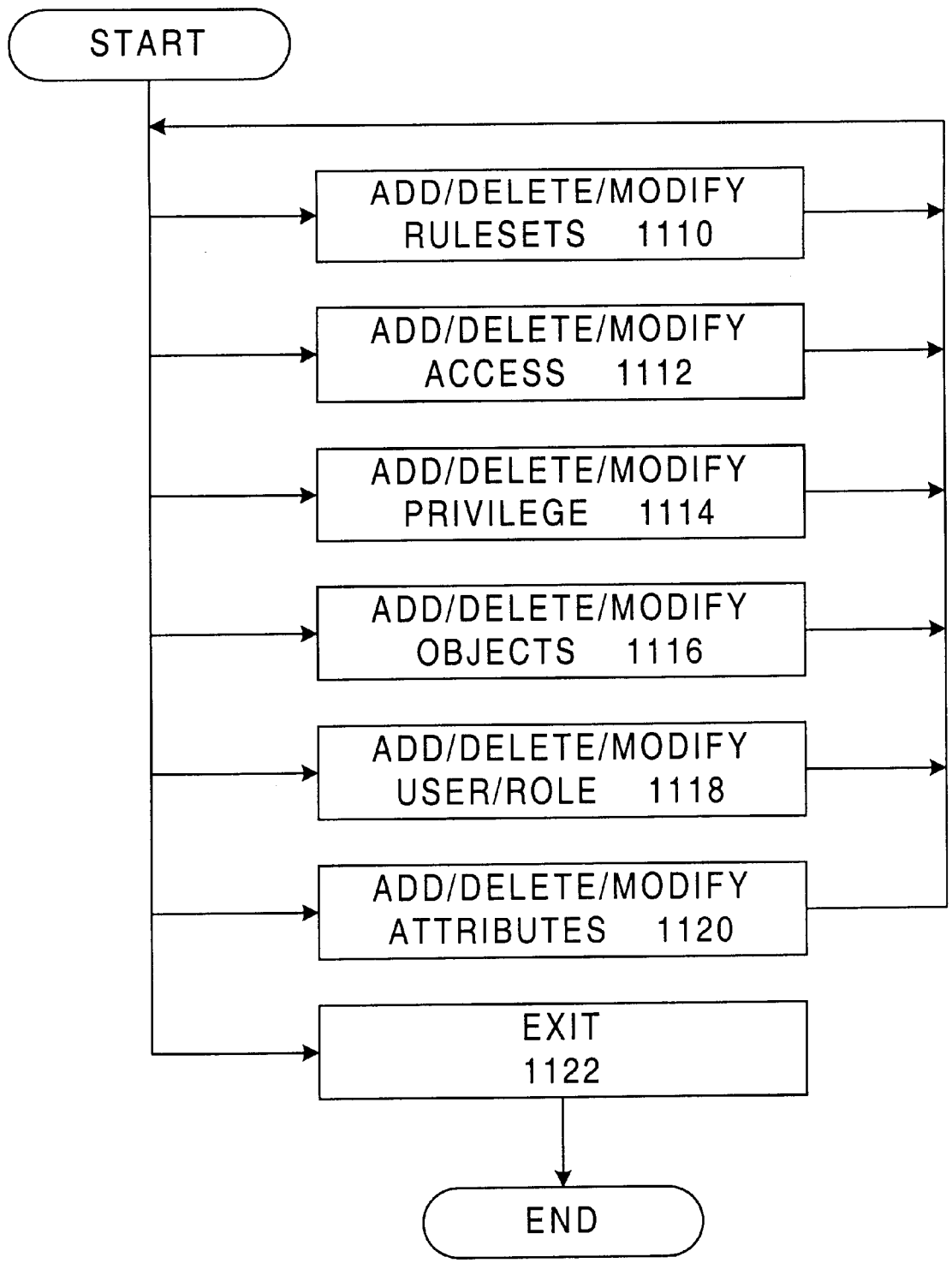
FIG. 11 is a flowchart of one embodiment to edit policy in the management station, in accordance with the present invention.

Referring now to FIG. 11, a flowchart of one embodiment of menu option edit policy 818 in management station 212 is shown. Edit policy 818 allows an authorized user to add, delete, and/or modify enterprise policy 224 features. The features that may be edited include rule sets 1110, access 1112, privilege 1114, objects 1116, user/role 1118, and attributes 1120. At step 1122, the system administrator may then exit edit policy 818.

Figure 12:
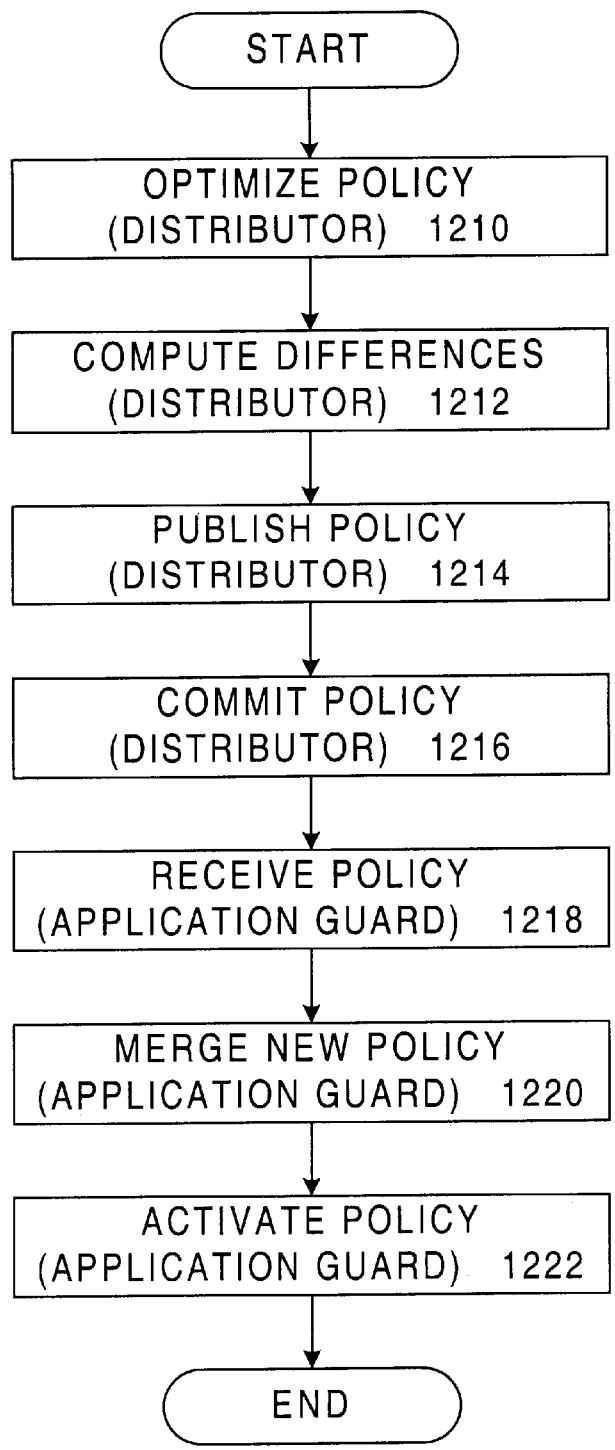
FIG. 12 is a flowchart of method steps to distribute policy, according to one embodiment of the present invention.

Referring now to FIG. 12, a flowchart of one embodiment of method steps of menu option distribute policy 820 is shown. After enterprise policy 224 has been initially entered or modified in any way, the modified features of enterprise policy 224 may then be distributed to appropriate application guards 310. At step 1210, upon selecting the distribute policy option, distributor 214 optimizes enterprise policy 224. Then at step 1212, differ 438 preferably computes any difference between the newly optimized policy and optimized policy 222. At step 1214, the newly optimized policy is then published as optimized policy 222 in DBMS 218. Next, at step 1216, only the changed portions of optimized policy 222 are committed to appropriate application guards 310. At step 1218, application guards 310 receive the changed policy, and then at step 1220, application guards 310 merge the changed policy into local client policy 318. Next at step 1222, new local client policy 318 is activated to work with application guard 310.

Figure 13:
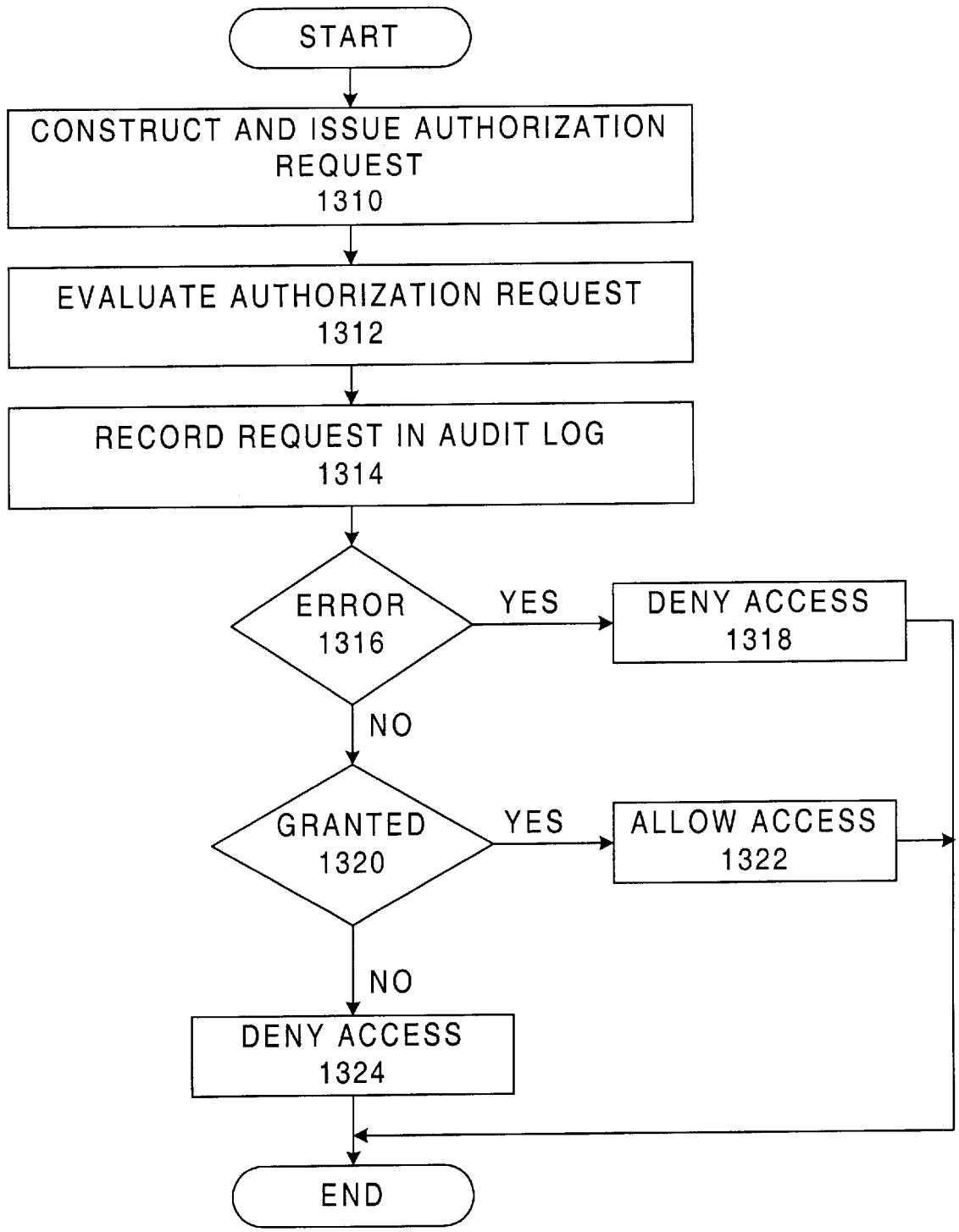
FIG. 13 is a flowchart of method steps for client access authorization, in accordance with one embodiment of the present invention.

Referring now to FIG. 13, a flowchart of one embodiment of method steps for client access authorization is shown. The FIG. 13 example for using a standard application guard 310 by a user begins with a user requesting access to a securable component protected by an application guard 310. In step 1310, application guard 310 constructs and issues an authorization request. At step 1312, the authorization request is evaluated by application guard 310 according to its local client policy 318 to determine whether to allow or deny the authorization request. At step 1314, audit 518 then records the authorization request in audit log 450. Next, at step 1316, if there is an error in the authorization request, or if the request is not valid, then at step 1318 the user is denied access. However, if the authorization request is valid, then at step 1320 it is determined whether access should be granted. If the evaluated authorization request does not deny access for the user, then at step 1322 access is allowed. If the evaluated authorization request denies access for the user, then at step 1324 access is denied.

Figure 14:
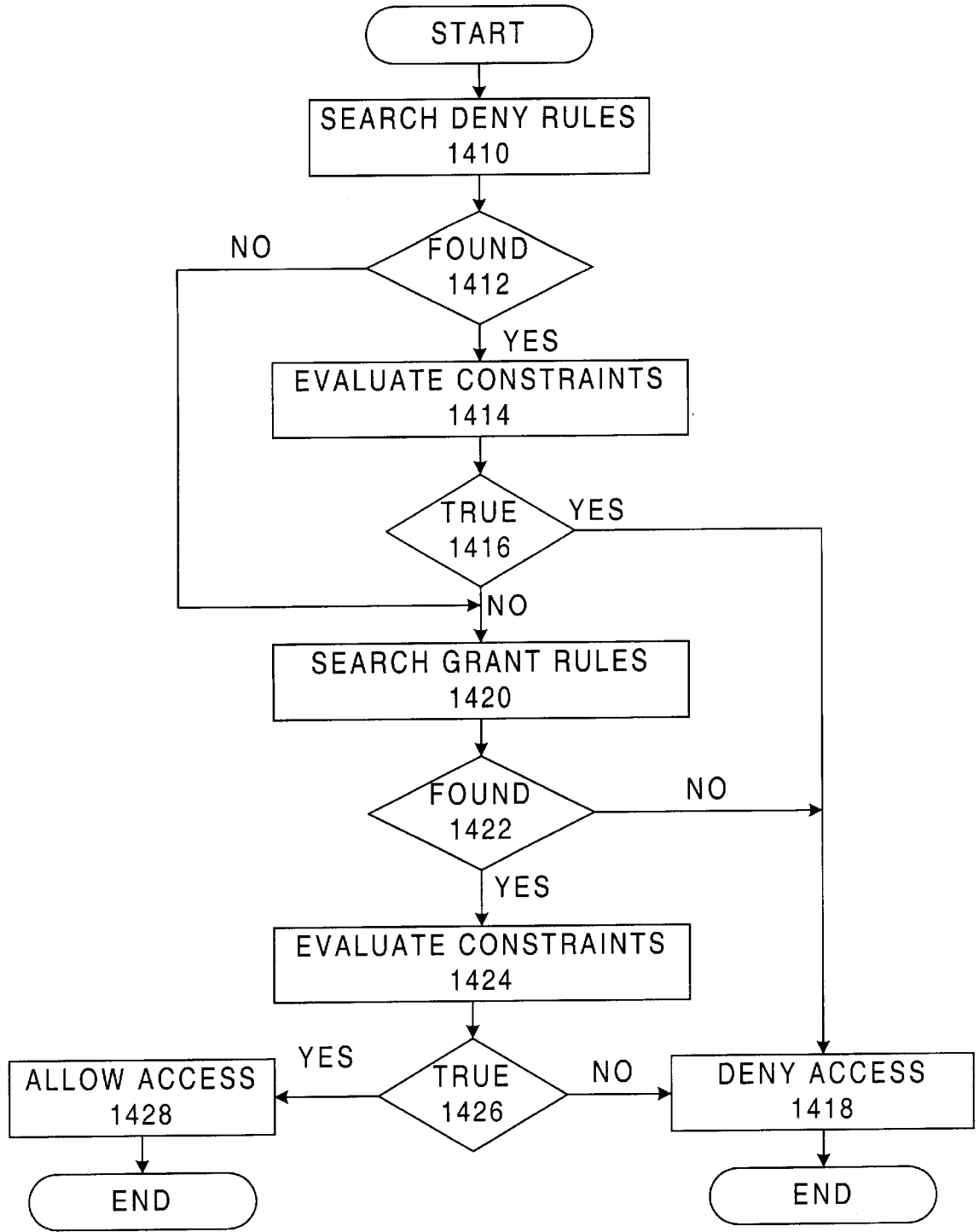
FIG. 14 is a flowchart of method steps to evaluate authorization request, according to one embodiment of the present invention.

Referring now to FIG. 14, a flowchart of one embodiment of method steps to evaluate an authorization request from an application guard 310 is shown. In order to evaluate an authorization request at application guard 310, in step 1420, evaluator 516 first searches any deny rules in local policy 318. At step 1412, if evaluator 516 finds any deny rules, then at step 1414, an evaluation is performed on any constraints on the deny rules. If, at step 1416, the evaluation finds presently valid constraints on the deny rules, then at step 1418 access is denied. However, if at step 1416, the evaluation finds that the constraints on the deny rules are not presently valid, or if no deny rules are found in foregoing step 1412, then at step 1420, a search of grant rules is performed. If no grant rules are found at step 1422 that would allow access for the user, then at step 1418, access is denied. If in step 1422 grant rules are found, then at step 1424 an evaluation is performed on any constraints in the grant rules. If the evaluated constraint is presently valid, then at step 1426, a true value is passed, and at step 1428 access is allowed. However, if the evaluated constraint is not presently valid, then at step 1426, a false value is passed, and at step 1418 access is denied.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for maintaining security in a distributed computing environment, comprising:
   a policy manager for managing a security policy; and
   an application guard for managing access to securable components as specified by the security policy, said securable components being selected from the group consisting of at least one application, a function within an application, a procedure within an application, a data structure within an application, a database object referenced by an application, or a file system object referenced by an application.

2. The system of claim 1, wherein said policy manager comprises a management station for constructing and editing the security policy.

3. The system of claim 2, wherein said policy manager further comprises a distributor for distributing the security policy to a client.

4. The system of claim 2, wherein said policy manager further comprises a distributor for distributing a customized local policy based on the security policy to a client.

5. The system of claim 4, wherein said policy manager further comprises a logger for recording and tracking authorization events that occur through the application guard.

6. The system of claim 4, wherein the policy manager further comprises a database management system for maintaining the security policy.

7. The system of claim 4, wherein the customized local policy is optimized.

8. The system of claim 1, wherein said system is scalable by further comprising a plurality of clients, said policy manager further managing and distributing a customized local policy to each client, and at least one additional application guard located on each client for managing access to the securable components as specified by each customized local policy.

9. The system of claim 1, wherein said application guard includes an application guard interface coupled to an application for requesting access to the securable components, and at least one authorization engine for evaluating requests from the application guard interface as specified by a customized local policy based on the security policy.

10. The system of claim 9, wherein said application guard interface is located on a client, and said at least one authorization engine and said customized local policy are located on a client server.

11. The system of claim 1, wherein the security policy is defined by a policy language to grant or deny access to the securable components for a particular user.

12. The system of claim 1 further comprising a policy loader for bulk loading the security policy onto the system.

13. The system of claim 1, wherein said policy manager includes a set of menu options to manage and distribute the security policy.

14. The system of claim 13, wherein said set of menu options include: navigate tree, analyze policy, edit policy, distribute policy, and view audit log.

15. The system of claim 1, wherein the application guard further allows for additional customized code to process and evaluate authorization requests based on the additional customized code.

16. The system of claim 1, wherein the policy manager further includes a policy manager application guard for managing access to the policy manager as specified by a local administrative policy.

17. A system for controlling user access in a distributed computing environment, comprising:

a global policy specifying access privileges of the user to securable components;

a policy manager located on a server for managing and distributing a local client policy based on the global policy to a client, and an application guard located on the client for managing access to the securable components as specified by the local client policy, said securable components being selected from the group consisting of at least one application, a function within an application, a procedure within an application, a data structure within an application, a database object referenced by an application, or a file system object referenced by an application.

18. The system of claim 17 further comprising at least one additional client, said policy manager further managing and distributing a customized local policy based on the global policy to each additional client, and at least one additional application guard located on each additional client for managing access to the securable components as specified by the customized local policy.

19. The system of claim 17, wherein said policy manager comprises:

a management station for constructing and editing the global policy; and a distributor for distributing the local policy to the client.

20. The system of claim 19, wherein said policy manager further comprises a database management system for maintaining the global policy.

21. The system of claim 17, wherein said policy manager further comprises a logger for recording and tracking authorization events that occur through the application guard.

22. The system of claim 17, wherein the global policy is defined by a policy language to grant or deny access to the securable components for a particular user.

23. The system of claim 17, wherein said system is scalable by further comprising a plurality of clients, said policy manager further managing and distributing a customized local policy to each client, and at least one additional application guard located on each client for managing access to the securable components as specified by each customized local policy.

24. The system of claim 17, wherein said application guard includes an application guard interface coupled to an application for requesting access to the securable components, and at least one authorization engine for evaluating requests from the application guard interface as specified by the local client policy.

25. The system of claim 17 further comprising a policy bulk loader for bulk loading the global policy onto the system.

26. The system of claim 17, wherein the local client policy is optimized.

27. The system of claim 17, wherein the application guard further allows for additional customized code to process and evaluate authorization requests based on the additional customized code.

28. The system of claim 17, wherein the policy manager further includes a policy manager application guard for managing access to the policy manager as specified by a local administrative policy.

29. A system for authorization that provides access to securable components for a user, comprising:

a policy specifying access privileges of the user to the securable components;

an application guard that allows for additional customized code to process and evaluate authorization requests based on the additional customized code; and a processor coupled to said system, said processor executing said application guard to manage access to the securable components.

30. The system of claim 29 further including an audit log for recording and tracking each authorization event that occurs though the application guard.

31. The system of claim 29, wherein said securable components are selected from the group consisting of: at least one application, a function within an application, a procedure within an application, a data structure within an application, a database object referenced by an application, or a file system object referenced by an application.

32. The system of claim 29, wherein said application guard comprises an application guard interface connected to an application for managing access to the securable components in said application.

33. The system of claim 29, wherein said application guard includes an application guard interface coupled to an application for requesting access to the securable components, and at least one authorization engine for evaluating requests from the application guard interface as specified by a customized local policy based on the policy.

34. The system of claim 33, wherein said application guard interface is located on a client, and said at least one authorization engine and said customized local policy are located on a client server.

35. A system for managing security in a distributed computing environment, comprising:

a policy manager specifying access priveleges to securable components selected from the group consisting of at least one application, a function within an application, a procedure within an application, a data structure within an application, a database object referenced by an application, or a file system object referenced by an application; and a processor coupled to said system, said processor executing said policy manager to manage and distribute a customized local policy based on a global policy to a client.

36. The system of claim 35, wherein said policy manager comprises a management station for constructing and editing the global policy.

37. The system of claim 36, wherein said policy manager further comprises a distributor for distributing the customized local policy to the client.

38. The system of claim 35, wherein said policy manager further comprises a logger for recording and tracking authorization events that are received from the client.

39. The system of claim 35, wherein said global policy specifies access privileges of at least one user to securable components.

40. The system of claim 35, wherein the policy manager comprises a database management system for maintaining the global policy.

41. The system of claim 35, wherein the global policy is defined by a policy language to grant or deny access to securable components for a particular user.

42. The system of claim 35, wherein said policy manager includes a set of menu options to manage and distribute the customized local policy.

43. The system of claim 35, wherein the customized local policy is optimized.

44. The system of claim 35, wherein the policy manager further includes a policy manager application guard for managing access to the policy manager as specified by a local administrative policy.

45. A method for maintaining security in a distributed computing environment, comprising the steps of:

managing a policy using a policy manager by specifying access privileges of a user to securable components selected from the group consisting of at least one application, a function within an application, a procedure within an application, a data structure within an application, a database object referenced by an application, or a file system object referenced by an application; and distributing the policy to a client having an application guard, whereby the application guard manages access to the securable components as specified by the policy.

46. The method of claim 45, further including the step of recording authorization events that occur through the application guard after distributing the policy.

47. A method for maintaining security on a client in a distributed computing environment, comprising the steps of:

constructing and issuing an authorization request for a user to access to securable components located on the client using an application guard, said securable components being selected from the group consisting of at least one application, a function within an application, a procedure within an application, a data structure within an application, a database object referenced by an application, or a file system object referenced by an application;

evaluating the authorization request using the application guard to determine if the authorization request is valid or invalid; and allowing access to the user via the application guard if the evaluated authorization request was valid, and denying access to the user via the application guard if the authorization request was invalid.

48. The method of claim 47, after evaluating the authorization request, further including the step of recording the authorization request in an audit log.

49. A computer-readable medium comprising program instructions for maintaining security in a distributed computing environment by performing the steps of:

managing a policy using a policy manager by specifying access privileges of a user to securable components selected from the group consisting of at least one application, a function within an application, a procedure within an application, a data structure within an application, a database object referenced by an application, or a file system object referenced by an application;

distributing the policy using the policy manager to a client having an application guard, whereby the application guard manages access to the securable components as specified by the policy; and executing said policy manager with a processor to manage and distribute the policy.

50. A computer-readable medium comprising program instructions for maintaining security on a client in a distributed computing environment by performing the steps of:

constructing and issuing an authorization request for a user to access to securable components located on the client using an application guard, said securable components being selected from the group consisting of at least one application, a function within an application, a procedure within an application, a data structure within an application, a database object referenced by an application, or a file system object referenced by an application;

evaluating the authorization request using the application guard to determine if the authorization request is valid or invalid;

allowing access to the user via the application guard if the evaluated authorization request was valid, and denying access to the user via the application guard if the authorization request was invalid; and executing said application guard with a processor to automatically maintain security on the client.

51. A system for maintaining security in a distributed computing environment, comprising:

means for managing a policy using a policy manager by specifying access privileges of a user to securable components selected from the group consisting of at least one application, a function within an application, a procedure within an application, a data structure within an application, a database object referenced by an application, or a file system object referenced by an application;

means for distributing the policy using the policy manager to a client having an application guard, whereby the application guard manages access to the securable components as specified by the policy; and means for executing the policy manager to manage and distribute the policy.

52. A system for maintaining security on a client in a distributed computing environment, comprising:

means for constructing and issuing an authorization request for a user to access to securable components located on the client using an application guard, said securable components being selected from the group consisting of at least one application, a function within an application, a procedure within an application, a data structure within an application, a database object referenced by an application, or a file system object referenced by an application;

means for evaluating the authorization request using the application guard to determine if the authorization request is valid or invalid;

means for allowing access to the user via the application guard if the evaluated authorization request was valid, and denying access to the user via the application guard if the authorization request was invalid; and means for executing said application guard to automatically maintain security on the client.

* * * * *